(12) United States Patent
Mao et al.

(10) Patent No.: US 6,559,237 B1
(45) Date of Patent: May 6, 2003

(54) SULFONATED PERFLUOROCYCLOBUTANE ION-CONDUCTING MEMBRANES

(75) Inventors: Shane S. Mao, Woodbury, MN (US); Krzysztof A. Lewinski, Oakdale, MN (US); David A. Ylitalo, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 157 days.

(21) Appl. No.: 09/587,522

(22) Filed: Jun. 5, 2000

(51) Int. Cl.$^7$ .................................. C08F 8/38
(52) U.S. Cl. ............... 525/326.2; 521/27; 525/344; 525/354
(58) Field of Search ............... 525/326.2, 344, 525/354; 521/27

(56) References Cited

U.S. PATENT DOCUMENTS

| | | | |
|---|---|---|---|
| 4,337,211 A | 6/1982 | Ezzell et al. | |
| 4,358,412 A | 11/1982 | Ezzell et al. | |
| 4,812,352 A | 3/1989 | Debe | |
| 4,904,701 A | 2/1990 | Hiyoshi et al. | |
| 5,021,602 A | 6/1991 | Clement et al. | |
| 5,023,380 A | 6/1991 | Babb et al. | |
| 5,037,917 A | 8/1991 | Babb et al. | |
| 5,037,918 A | 8/1991 | Babb | |
| 5,037,919 A | 8/1991 | Clement et al. | |
| 5,039,561 A | 8/1991 | Debe | |
| 5,066,746 A | 11/1991 | Clement et al. | |
| 5,159,036 A | 10/1992 | Babb | |
| 5,159,037 A | 10/1992 | Clement et al. | |
| 5,159,038 A | 10/1992 | Babb et al. | |
| 5,162,468 A | 11/1992 | Babb et al. | |
| 5,198,513 A | 3/1993 | Clement et al. | |
| 5,210,265 A | 5/1993 | Clement et al. | |
| 5,246,782 A | 9/1993 | Kennedy et al. | |
| 5,264,508 A | 11/1993 | Ishibe et al. | |
| 5,338,430 A | 8/1994 | Parsonage et al. | |
| 5,364,547 A | 11/1994 | Babb et al. | |
| 5,364,917 A | 11/1994 | Babb et al. | |
| 5,393,852 A | 2/1995 | Ishibe et al. | |
| 5,409,777 A | 4/1995 | Kennedy et al. | |
| 5,426,164 A | 6/1995 | Babb et al. | |
| 5,449,825 A | 9/1995 | Ishibe et al. | |
| 5,620,807 A | 4/1997 | Mussell et al. | 429/33 |
| 5,879,828 A | 3/1999 | Debe et al. | 429/41 |
| 5,910,378 A | 6/1999 | Debe et al. | 429/42 |

FOREIGN PATENT DOCUMENTS

| | | |
|---|---|---|
| JP | 82 094006 | 6/1982 |
| JP | 62 023401 | 1/1987 |
| WO | WO 86/00624 | 1/1986 |
| WO | WO 90/15043 | 12/1990 |
| WO | WO 96/13872 | 5/1996 |
| WO | WO 97/25369 | 7/1997 |
| WO | WO 97/26284 | 7/1997 |
| WO | WO 99/05126 | 2/1999 |
| WO | WO 99/38842 | 8/1999 |

Primary Examiner—Bernard Lipman
(74) Attorney, Agent, or Firm—Philip Y. Dahl

(57) ABSTRACT

Disclosed are sulfonated aromatic perfluorocyclobutane polymers meeting a condition selected from: a) the equivalent weight of the polymer is 5000 or less, and b) the proton conductivity of the polymer at 25° C. is 0.01 Siemens per centimeter (S/cm) or higher, and methods of making same, especially sulfonated aromatic perfluorocyclobutane polymers which comprise units according to the formula:

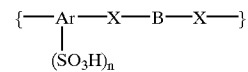

wherein —B— is 1,2-perfluorocyclobutylene ($C_4F_6$); each —X— is independently selected from the group consisting of: a bond, —O—, —S—, —SO—, —SO$_2$—, —CO—, —NH—, —NR$_1$—, and —R$_2$—, wherein R$_1$ is C1–C25 substituted or unsubstituted, saturated or unsaturated alkyl or aryl and R$_2$ is C1–C25 substituted or unsubstituted, saturated or unsaturated alkylene or arylene; —Ar— is a substituted or unsubstituted C1–C30 at least divalent aromatic hydrocarbon group; n is a non-negative integer chosen independently for each of said repeating units such that the average for the polymer is greater than 0. They are particularly useful in ion conducting membranes for use in electrochemical cells.

27 Claims, 5 Drawing Sheets

SULFONATED PERFLUOROCYCLOBUTANE ION-CONDUCTING MEMBRANES

TECHNICAL FIELD

This invention relates to sulfonated perfluorocyclobutane polymers suitable for use as ion-conducting membranes, including proton exchange membranes, and methods for making same.

BACKGROUND

Ion conducting membranes (ICM's) are used in electrochemical cells as solid electrolytes. The ICM is the central portion of a membrane electrode assembly (MEA), typically sandwiched between two catalytic electrode layers. ICM's allow ions to move between an anode and a cathode, thereby allowing electrical current to flow in an external circuit that connects the two electrodes.

In a typical hydrogen/oxygen fuel cell, the ions conducted by the ICM are protons ($H_+$). To make an efficient fuel cell, the ICM must not conduct electrons and must have little or no permeability to the fuel gasses.

U.S. Pat. No. 5,620,807 discloses the use of a perfluorocyclobutylene polymer to support electrically conductive particles in a gas-permeable porous outer layer of a membrane electrode assembly. This reference does not teach the use of a perfluorocyclobutylene polymer as an ion conducting membrane.

DISCLOSURE OF INVENTION

Briefly, the present invention provides a sulfonated aromatic perfluorocyclobutane polymer meeting a condition selected from: a) the equivalent weight of the polymer is 5000 or less; and b) the proton conductivity of the polymer at 25° C. is 0.01 Siemens per centimeter (S/cm) or higher. In addition, the present invention provides a sulfonated aromatic perfluorocyclobutane polymer comprising units according to the formula:

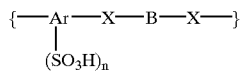

wherein —B— is 1,2-perfluorocyclobutylene ($C_4F_6$); each —X— is independently selected from the group consisting of: a bond, —O—, —S—, —SO—, —$SO_2$—, —CO—, —NH—, —$NR_1$—, and —$R_2$—, wherein $R_1$ is C1–C25 substituted or unsubstituted, saturated or unsaturated alkyl or aryl and $R_2$ is C1–C25 substituted or unsubstituted, saturated or unsaturated alkylene or arylene; —Ar— is a substituted or unsubstituted C1–C30 at least divalent aromatic hydrocarbon group; and n is a non-negative integer chosen independently for each of the repeating units such that the average for the polymer is greater than 0.

In another aspect, the present invention provides a process for preparing a polymer comprising the step of sulfonating a perfluorocyclobutane polymer to form a sulfonated perfluorocyclobutane polymer, wherein said sulfonated perfluorocyclobutane polymer is sufficiently sulfonated as to meet a condition selected from: a) the equivalent weight of the polymer is 5000 or less; and b) the proton conductivity of the polymer at 25° C. is 0.01 S/cm or higher. The step of sulfonation can be accomplished, e.g., by use of sulfuric acid, or by applying a halosulfonic acid to add sulfonyl halide groups and thereafter hydrolyzing the sulfonyl halide groups to form sulfonic acid groups.

The present invention also provides a process for preparing a sulfonated perfluorocyclobutane polymer comprising: A) providing a perfluorocyclobutane polymer including sulfur-containing groups; and B) converting said sulfur-containing group into a sulfonic acid group to form a sulfonated perfluorocyclobutane polymer, wherein said sulfonated perfluorocyclobutane polymer is sufficiently sulfonated as to meet a condition selected from: a) the equivalent weight of the polymer is 5000 or less; and b) the proton conductivity of the polymer at 25° C. is 0.01 S/cm or higher.

In this document:

"C(number)" refers to a chemical moiety containing the indicated number of carbon atoms;

"substituted" when used without reference to a particular substituent, means substituted by conventional substituents which do not interfere with the desired product or process, e.g., substituents can be alkyl, alkoxy, aryl, phenyl, halo (F, Cl, Br, I), cyano, nitro, etc.; and "sulfonation" refers to addition of a sulfonate group, a group that is readily hydrolyzed to a sulfonate such as a sulfonyl halide, or a sulfur-containing proton-conducting group such as a sulfonimide.

The polymers of the present invention can achieve a combination of high ionic conductivity, low electron conductivity, good dimensional stability, and good mechanical strength, making them excellent choices for use in ion conducting membranes. These polymers are useful as proton exchange membranes in fuel cell applications.

DETAILED DESCRIPTION

Figure 1:
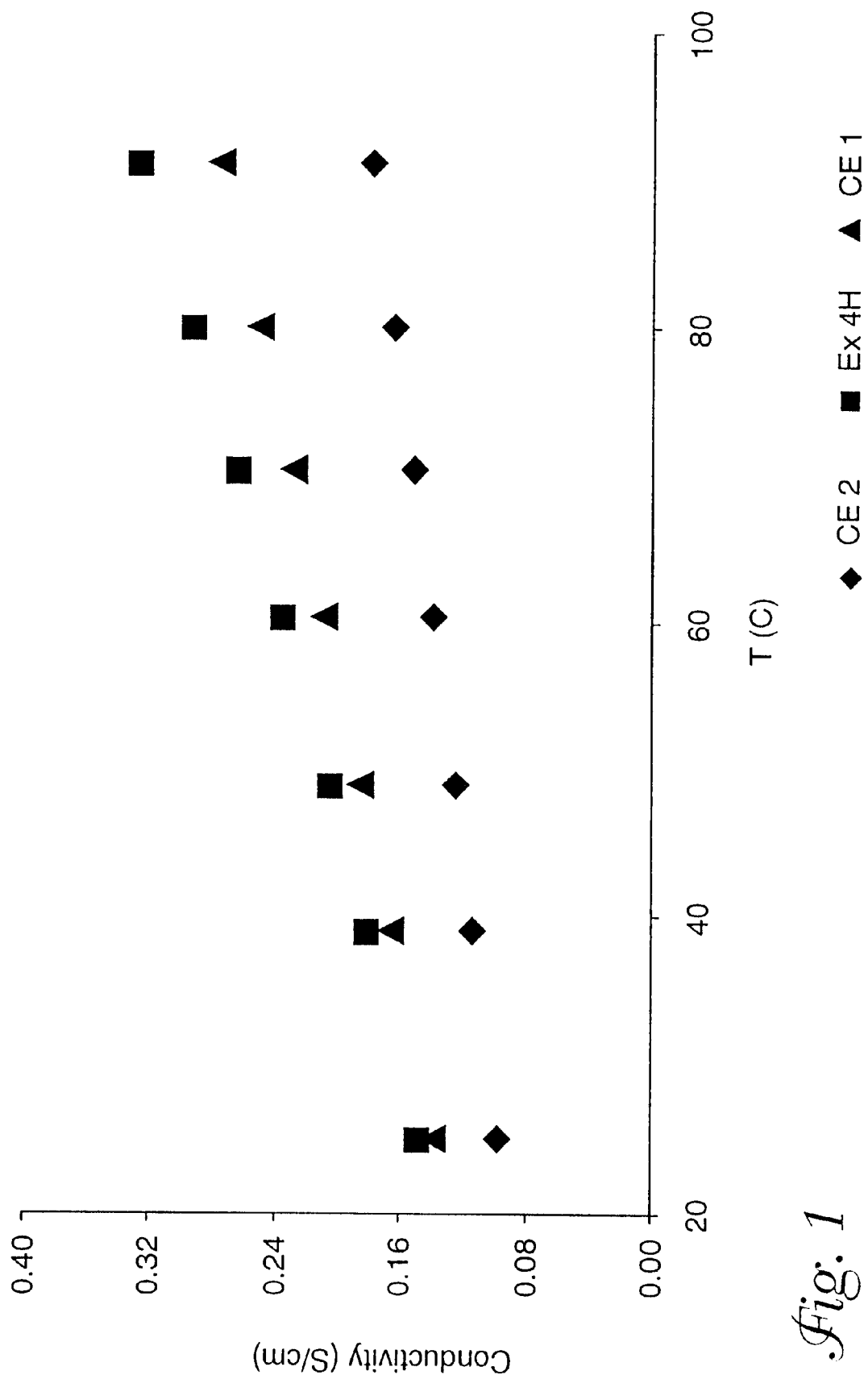
FIG. 1 is a graph of temperature versus ionic conductivity for one embodiment of the present invention and two comparative examples.

The present invention provides a sulfonated aromatic perfluorocyclobutane polymer meeting a condition selected from: a) the equivalent weight of the polymer is 5000 or less; and b) the proton conductivity of the polymer at 25° C. is 0.01 Siemens per centimeter (S/cm) or higher. In a preferred embodiment, the polymer comprises units according to the formula:

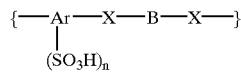

wherein —B— is 1,2-perfluorocyclobutylene ($C_4F_6$). Each —X— is independently selected from: a bond, —O—, —S—, —SO—, —$SO_2$—, —CO—, —NH—, —$NR_1$—, and —$R_2$—, wherein $R_1$ is C1–C25 substituted or unsubstituted, saturated or unsaturated alkyl or aryl and $R_2$ is C1–C25 substituted or unsubstituted, saturated or unsaturated alkylene or arylene. Preferably, $R_1$ and $R_2$ are selected from C1–C3 alkyl groups. Each —X— is preferably selected from oxygen and sulfur and is most preferably oxygen.

Each Ar is a substituted or unsubstituted C1–C30 at least divalent aromatic hydrocarbon group. Preferred Ar groups include phenylene, biphenylene, diphenylene alkenes, naphthylene, anthracene, fluorene, and the like. Ar is preferably phenylene or biphenylene.

In the formula above, n represents a non-negative integer chosen independently for each of said repeating units such that the average for the polymer is greater than 0. As the average value for n is increased, the equivalent weight of the polymer decreases.

The equivalent weight of an acid is the mass that contains one mole of acid functional groups, e.g., acidic hydrogen. The equivalent weight of an ICM is the number of acidic group equivalents in the polymeric membrane divided by the weight of the polymer. Lower values of equivalent weight generally correspond to increased ionic conductivity, to the limit that excessive swelling begins.

Known ICM materials made from low equivalent weight polymers may have reduced mechanical strength and dimensional stability in comparison to higher equivalent weight forms of the same polymer. In contrast, the polymers of the present invention advantageously maintain sufficient mechanical strength and dimensional stability at low equivalent weights. The equivalent weights of these materials can be controlled within narrow ranges. Polymers according to the present invention can be advantageously made having an equivalent weight of 5000 or less, more preferably 2500 or less, more preferably 1250 or less, and most preferably 800 or less, while maintaining sufficient mechanical strength and dimensional stability for use as an ICM.

Polymers with high proton conductivity are desirable for use in an ICM. High proton conductivity with low resistive loss is advantageous to support high current levels in electrochemical cell, e.g., fuel cell, use. The materials according to the present invention can be made having an ionic conductivity of 0.01 Siemens per centimeter (S/cm) or greater at room temperature (25° C.), more preferably 0.02 S/cm or greater, and most preferably 0.10 S/cm or greater. The ionic conductivity is preferably the same or higher in the operating temperature range of the electrochemical device in which the ICM is used.

The polymer of the present invention may be produced by any appropriate method. Monomers useful in preparing the polymer of the present invention contain two or more polymerizable trifluorovinyl groups. Monomers are preferably of the formula $CF_2=CF-X-Ar-X-CF=CF_2$, where X and Ar are as defined above except that Ar may contain additional functional groups, as described below. Specific examples of Ar include 4,4'-bis(trifluoro vinyloxy) biphenylene, 1,4-bis(trifluorovinyloxy)phenylene, 1,3-bis(trifluorovinyloxy) phenylene, perchlorophenylene, phenylene, biphenylene, naphthylene, dichlorophenylene, nitrophenylene; p,p'-(2,2-diphenylene propane) {—$C_6H_4$—$C(CH_3)_2$—$C_6H_4$—}; p,p'-(2,2diphenylene-1,1,1,3,3,3 hexafluoropropane) {—$C_6H_4$—$C(CF_3)_2$—$C_6H_4$—}; 9,9-diphenylenefluorene, oxydiphenylene, thiodiphenylene, 1,1,1-triphenylene ethane; 1,3,5-triphenylene benzene; 1,3,5-tris(2-phenylene-2-propyl) benzene; 1,1,1-triphenylene methane; 1,1,2,2,-tetraphenyl-1,2-diphenylene ethane; 2,2-diphenylene propane; 2,2-diphenylene-1,1,1,3,3,3-hexafluoropropane; 1,1-diphenylene-1-phenylethane; naphthalene, and anthracene.

Polymerization involves joining trifluorovinyl groups of monomer molecules to form perfluorocyclobutylene groups.

Any suitable reaction conditions may be used. In one method, monomers are heated to temperatures of about 200° C. for about 72 hours. The resulting polymers have typical weight average molecular weights (Mw) of about 60,000. Suitable reaction conditions may additionally be found in U.S. Pat. Nos. 5,021,602, 5,023,380, 5,037,917, 5,037,918, 5,037,919, 5,066,746, 5,159,036, 5,159,037, 5,159,038, 5,162,468, 5,198,513, 5,210,265, 5,246,782, 5,364,547, 5,364,917, 5,409,777 and 5,426,164, the teachings of which are incorporated herein by reference. PCFB oligomers or lower molecular weight PFCB polymers can be used in place of or along with monomers to produce higher molecular weight polymers according to the present invention.

Crosslinkers or branching agents containing three or more reactive trifluorovinyl groups may be added. Exemplary agents include tris(trifluorovinyloxyaryl)alkanes such as 1,1,1-tris(4'-trifluorovinyloxyphenyl)ethane and others cited in U.S. Pat. Nos. 5,037,918 and 5,159,036, incorporated herein by reference.

In one method, a sulfonated perfluorocyclobutane polymer is formed using the step of sulfonating a perfluorocyclobutane polymer, wherein the sulfonated perfluorocyclobutane polymer is sufficiently sulfonated as to meet a condition selected from: a) the equivalent weight of the polymer is 5000 or less; and b) the proton conductivity of the polymer at 25° C. is 0.01 S/cm or higher.

In another aspect, the invention provides a process for preparing a sulfonated perfluorocyclobutane polymer comprising providing a perfluorocyclobutane polymer including sulfur-containing groups; and converting at least some of said sulfur-containing groups into sulfonic acid groups to form a sulfonated perfluorocyclobutane polymer, wherein said sulfonated perfluorocyclobutane polymer is sufficiently sulfonated as to meet a condition selected from: a) the equivalent weight of the polymer is 5000 or less; and b) the proton conductivity of the polymer at 25° C. is 0.01 S/cm or higher.

The step of sulfonation can be accomplished by any suitable method. In one preferred method the step of sulfonation is accomplished by applying a halosulfonic acid, preferably chlorosulfonic acid, to add sulfonyl halide groups and thereafter hydrolyzing the sulfonyl halide groups to form sulfonic acid groups. Halosulfonic acids suitable for the present sulfonation reaction include chlorosulfonic acid and fluorosulfonic acid. Alternately, sulfonation can be accomplished by application of another acid such as sulfuric acid.

The polymer may be formed into a membrane at any time relative to the sulfonation process, including before the step of sulfonation, after the step of sufonation, or between the step of applying the halosulfonic acid and the step of hydrolyzing the sulfonyl halide groups. The polymer may be formed by first providing monomers that comprise two or more dimerizable perfluorovinyl functional groups and then heating these monomers to form the perfluorocyclobutane polymer.

Sulfonated aromatic perfluorocyclobutane polymers according to the present invention may be advantageously used to make ICM's for use in electrolytic cells. For example, these ICM's may be incorporated into a membrane electrode assembly, fuel cell, or the like, as taught by U.S. Pat. Nos. 5,338,430, 5,879,828 and 5,910,378, which are herein incorporated by reference.

The polymer may be formed into a membrane by any suitable method. The polymer can be dissolved into a suitable solvent and cast and/or coated to reach a desired thickness after solvent is removed.

Suitable solvents for the sulfonation reaction include those in which both the halosulfonic acid and the PFCB membrane are soluble, and are generally classified as halogenated solvents. Examples of solvents useful in the invention include dichloroethane, trichloroethane, halocarbon solvents comprising both chloro- and fluoro-substituents such as chlorotrifluoroethane, and perfluorinated solvents such as those available under the FLUORINERT™ brand from 3M Company, St. Paul, Minn.

Polymers for use in ICM's advantageously demonstrate sufficiently high mechanical strength, dimensional stability, and chemical stability. High mechanical strength allows the formation of thinner and lower equivalent weight membranes, and an increase in the power provided per unit weight in a final fuel cell assembly. The polymer according to the present invention can be advantageously used to make a membrane 200 $\mu$m or less in thickness, more preferably 50 $\mu$m or less and most preferably 30 $\mu$m or less.

ICM's advantageously have good dimensional stability, exhibiting limited dimensional changes when absorbing water. Dimensional stability is expressed as a ratio (percent) of the difference in dimensions between a wet and dry membrane divided by the dry membrane dimension. If the water uptake of these materials is too high, the proton transporting sulfonic acid groups in the membrane are diluted, which decreases the ionic conductivity. The polymer according to the present invention can be advantageously used to make a membrane that demonstrates dimensional stability of less than 40 percent variation, more preferably less than 30 percent, and most preferably less than 25 percent.

The ICM is preferably chemically stable in the environment found in an electrochemical cell, such as a fuel cell. The ICM is advantageously impervious or substantially impervious to passage of gasses, particularly reactant gasses used in electrochemical cells, such as air, oxygen, hydrogen, chlorine, and the like. The polymer according to the present invention can be advantageously used to make a membrane that substantially or completely meets these requirements.

Objects and advantages of this invention are further illustrated by the following examples. The particular materials and amounts thereof recited in these examples, as well as other conditions and details, should not be construed to unduly limit this invention.

EXAMPLES

In the examples, all parts, ratios and percentages are by weight unless otherwise indicated. The following test methods were used to characterize the compositions in the examples.

Test Methods
Ionic Conductivity

The conductivity measurements used herein were based on work published by T. Zawodzinski, et al., J. Phys. Chem., 1991, 95, 6040. A 10×40 mm strip of the membrane to be tested was boiled in deionized (DI) water for 2 hours before testing, then fitted into a two point test cell and submersed in DI water at room temperature. The test cell includes two 10×10 mm electrode contact areas separated by 20 mm. The Ohmic (real) and capacitive (imaginary) components of the membrane impedance were measured by impedance spectroscopy at a frequency range of from 100 kHz to 10 Hz, 0V DC, and 100 mV AC. A plot of imaginary vs. real impedance (impedance plot or Nyquist plot) generated a curve that was extrapolated to a zero imaginary component of complex impedance, where the ICM impedance was measured. Conductivity in S/cm was calculated from the measured value of impedance, the cell constant and membrane thickness.

Dimensional Stability

Samples were immersed in water at room temperature (23° C.) until no further weight gain was observed, and the dimensions were recorded. Then the samples were vacuum-dried at 100° C. and 13.3 Pa for 24 hours and the dimensions were measured again. Dimensional stability was calculated as the difference of dimensions of wet and dry membranes, divided by dimension of the dry membrane, and reported as a percentage. Table 2 displays the dimensional stability measured for sulfonated membranes of the invention.

Water Absorption Capacity

Samples were immersed in boiling water, then in water at room temperature (23° C.), until no further weight gain was observed, and the maximum weight was recorded. The samples were dried at 100° C. and 13.3 Pa for 2 hours, then reweighed. Water absorption capacity was calculated as the difference between the wet and dry weights divided by the dry weight, reported as a percentage. Table 2 displays the water absorption capacity measured for sulfonated membranes of the invention.

Mechanical Properties

Samples of membranes were cut 6.35 mm wide by at least 50 mm long. Each sample was clamped into an Instron model 2511-103 tensile tester (from Instron Corp., Canton, Mass.) fitted with an MTS Sintech ReNew package (from MTS Systems Corp., Eden Prairie, Minn.) using a 223 Newton (N) tension load cell, in accordance with ASTM D 638-96. The initial grip separation was 25.4 mm. Each sample was stretched by separating the grips at a constant rate of 50.8 mm per minute until the sample broke, during which the load was measured. The modulus of elasticity, tensile stress at yield, tensile stress at break, percent elongation at yield, and percent elongation at break were measured using the extension and load measurements. In some cases (particularly, in all cases where the samples were hydrated), the sample did not exhibit a yield stress, since at no time was the stress independent of the strain. In all cases, the tensile strength of the sample corresponded to the tensile stress at break. The test was repeated for 3 to 5 samples and the results averaged. Table 3 displays the mechanical properties for sulfonated membranes measured for the invention.

Membrane Performance

In the following examples, the nanostructured catalyst supports were made according to the process described in U.S. Pat. No. 5,338,430, and other patents referenced therein, all incorporated herein by reference. Nanostructured perylene red films on polyimide substrates were made using the techniques described in U.S. Pat. Nos. 4,812,352 and 5,039,561 by thermal evaporation and vacuum annealing of the organic pigment C.I. Pigment Red 149, i.e., N,N'-di(3, 5-xylyl)perylene-3,4:9,10-bis(dicarboximide) (available as PR 149 from American Hoechst Corp., Somerset, N.J.). After deposition and annealing, highly oriented crystal structures were formed with large aspect ratios, controllable lengths of about 0.5 to 2 $\mu$m, widths of about 0.03–0.05 $\mu$m and a real number density of approximately 30 whiskers per square $\mu$m, oriented substantially normal to the polyimide substrate. These microstructure catalyst supports were non-conductive until coated with a metal catalyst and separated readily from the polyimide substrate when pressed into an ICM. Catalyst material was coated on the whiskers by e-beam deposition.

Measurement of catalyst loading was done by a simple gravimetric method after deposition. A sample of the polyimide-supported nanostructured film layer was massed using a digital balance accurate to about one microgram. Then the nanostructured layer was wiped off the polyimide substrate using a paper tissue or linen cloth, and the substrate was remassed. Because a preferred property of the nanostructured catalyst support is that it transfer easily and completely to the ion exchange membrane, it also was easily removed by simple wiping with a cloth. The mass per unit area of the catalyst support particles, without Pt, was also measured this way.

Nanostructured elements were incorporated into MEAs using a static pressing procedure. The static pressing procedure consisted of transfer of the catalyst-coated nanostructured elements into the membrane by pressing under vacuum at 130° C. and a pressure of 440 MPa. Both anodic and cathodic catalysts were the same (150 nm whiskers, 100 nm Pt). The cell was assembled with a polyimide spacer having a thickness of 25 $\mu$m, exposing 0.95 cm$^2$ of active circular catalyzed area. The diffuser was ELAT™ electrode backing material (from E-TEK, Inc., Natick, Mass.) on both sides. Standard, glass-reinforced Teflon gaskets (from The Furon Co., CHR Division, New Haven, Conn.) were used. The cell was torqued to a force of 12.4 Nm (Newton-meters). MEA's were mounted in a test cell station (Fuel Cell Technologies, Inc., Albuquerque, N. Mex.). The test station includes a variable electronic load with separate anode and cathode gas handling systems to control gas flow, pressure and humidity. The electronic load and gas flow are computer controlled. The cell operating conditions were cell temperature, 75° C.; anode humidifier (sparge bottle) 115° C.; cathode humidifier (sparge bottle) 65° C.; hydrogen gas at 304 kPa and oxygen gas at 507 kPa at near-stoichiometric flow. Each fuel cell was brought to operating conditions at 65° C. under hydrogen and air flows. Test protocols were initiated after 24 hours of operation and the following variables were measured: anode pressure, anode flow, cathode pressure, cathode flow, and cell temperature. The performance test used cyclic polarization of the cell between 1.0 and 0.3 V at 10 mV/s scan rate.

Materials Used

Monomer A 4,4'-bis(trifluorovinyloxy)biphenyl, as described in U.S. Pat. No. 5,037,917, Example 1.
Branching Agent 1,1,1-tris(4'-trifluorovinyloxyphenyl)ethane, as described in U.S. Pat. No. 5,159,037, Example 3.

Example 1

Bulk Polymerization of 4,4'-Bis(trifluorovinyloxy)biphenyl (I)

This example provided a sulfonated PFCB polymer.

Monomer A was added to a covered, glass interior, controlled-temperature reactor, heated to 200° C. and maintained at that temperature for 72 hours. This step thermally polymerized the monomer into a perfluorocyclobutane (PFCB) arylether polymer, Polymer 1A. The yield was 95 weight percent (wt %). The resulting Polymer 1A had weight average molecular weight (Mw) of 58,000.

Polymer 1A was added in the ratio of 99.3 wt % polymer to 0.7 wt % Branching Agent. The mixture was maintained at 200° C. for 16 hours, resulting in a branched PFCB arylether polymer (Polymer 1B) having a Mw of 194,000. Increasing the reaction time did not lead to a higher molecular weight. GPC revealed that these polymers had a monomodal molecular weight distribution and the addition of the Branching Agent caused the weight average molecular weight to increase, as compared to Polymer 1A. Use of 1.5 wt % of Branching Agent produced highly crosslinked, insoluble materials.

2.5 g of Polymer 1A was sulfonated with 2.5 g of chlorosulfonic acid in 25 ml dichloroethane, at 55° C. for half a hour, followed by quenching in ice water to yield 2 g of powder. Equivalent weight of the sulfonated polymer was 850.

Example 2

Use of Branching Agent

This example produced polymers having a bimodal molecular weight distribution using various levels of Branching Agent.

A temperature-controlled vessel was charged with 0.5, 0.7, 1.0 wt % Branching Agent and the balance to reach 100 wt % was Monomer A, as listed in Table 1. The combination was thermally polymerized by maintaining the vessel at 200° C. for 16 hours. The results were chain-extended (branched) perfluorocyclobutane arylether polymers (Polymer B), as in Example 1. Longer reaction times did not change the molecular weight. Interestingly, these polymers all had a bimodal molecular weight distribution as determined by GPC. The results appear in the table below. Sample 2D was a highly crosslinked, insoluble material.

TABLE 1

| Example | Branching Agent | Mw |
|---|---|---|
| 1A | 0 | 58,000 |
| 2A | 0.5 | 70,000 |
| 2B | 0.7 | 122,000 |
| 2C | 1.0 | 200,000 |
| 2D | 1.5 | n/a |

2.5 g of sample 2B was sulfonated with 2.5 g of chlorosulfonic acid in 25 ml dichloroethane, at 55° C. for half a hour, followed by quenching in ice water to yield 2.2 g of powder. The equivalent weight of sulfonated polymer 2B was 1020. A membrane was produced from the sulfonated product by casting from THF solution.

Example 3

Catalytic Polymerization of 4,4'-Bis(trifluorovinyloxy)biphenyl (I)

Monomer A was polymerized at 180° C. for 16 hours in the presence of 10 wt % of an anionic polymerization initiator, Pr$_4$NPF$_6$ (from Aldrich Chemical Co., Milwaukee, Wis.), to yield a branched PFCB arylether polymer exibiting a monomodal molecular weight distribution. The polymer exhibited a Mw of 190,000. The polymer was characterized by proton, fluorine and carbon NMR, elemental analysis, and IR spectrometry.

Example 4

Sulfonation

Sulfonation of the branched PFCB arylether polymer of Example 3 was carried out in a controlled fashion to form sulfonated perfluorocyclobutane arylether polymer. The PFCB polymer was dissolved in a hot dichloroethane solution (65° C.), followed by addition of, respectively, 0.5 to 3.0 equivalents of chlorosulfonic acid per repeating unit equivalent weight of the polymer, as shown in Table 2. The reaction mixtures were stirred at 65° C. for one hour, then quenched with ice water. White fibrous polymers (SPFCB series, Samples 4A through 4J) were isolated in over 95% yields.

Examples 5

Preparation of Ion Conducting Membranes (ICMs)

SPFCB polymers (Samples 4A through 4J) were dissolved in THF to form 10% solutions. The solutions were filtered through a 0.45-μm Teflon filter, then cast on a flat surface (silicon wafer), and dried in air. After evaporation of the solvent, the free-standing membranes were peeled away from the silicon wafer, and the membranes were immersed in boiling water for 2 hours. Then, the membranes were stored in deionized water. Physical properties of membranes are shown in Table 2.

Comparative Example 1 (CE 1) was an 800 equivalent weight perfluorinated alkyl ether ion-exchange polymer having —$SO_3$— anion groups attached, available in experimental sample quantities as Dow 800, from Dow Chemical Co., Midland, Mich. Comparative Example 2 (CE2) was a solution of an 1100 equivalent weight perfluorinated alkyl ether ion-exchange polymer having —$SO_3$— anion groups attached (available as Nafion™ 1100, produced by DuPont and available from ElectroChem, Inc., Woburn, Mass.).

TABLE 2

Conductivity, Water Uptake and Dimensional Stability of SPFCB Series Membranes

| Ex. | CISO$_3$H equiv. | –SO$_3$H equiv. wt. | Conductivity 25° C. (S/cm) | Conductivity 80° C. (S/cm) | Water Uptake (%) | Dimensional Stability (% var) |
|---|---|---|---|---|---|---|
| 3 | 0 | N/A | <0.001 | <0.001 | <5 | <5 |
| 4A | 0.5 | 1919 | 0.011 | 0.012 | <5 | <5 |
| 4B | 0.75 | 1306 | 0.020 | 0.031 | <5 | <5 |
| 4C | 1.0 | 1000 | 0.025 | 0.042 | 8.5 | 6 |
| 4D | 1.25 | 816 | 0.032 | 0.058 | 12 | 8 |
| 4E | 1.5 | 693 | 0.041 | 0.076 | 24 | 11 |
| 4F | 2.0 | 540 | 0.089 | 0.175 | 43 | 16 |
| 4G | 2.25 | 489 | 0.106 | 0.188 | 50 | 27 |
| 4H | 2.5 | 448 | 0.147 | 0.294 | 56 | 30 |
| 4J | 3.0 | 387 | 0.136 | 0.257 | 78* | 27* |
| CE 1 | N/A | 800 | 0.14 | 0.251 | 43 | 25 |
| CE 2 | N/A | 1100 | 0.083 | 0.164 | 35 | 29 |

*Swelled significantly in boiling water; measured at 80° C.

The data showed that the conductivity of the ICM increased with the number of molar equivalents of the chlorosulfonic acid, peaking between 2.25 and 3.0 equivalents. The conductivity of the membrane prepared from Example 4H was higher than that of Comparative Example 1, and about twice as high as that of Comparative Example 2.

FIG. 1 illustrates the conductivity at various temperatures of membranes prepared from Example 4H, along with two known membranes CE 1 (Dow 800) and CE 2 (Nafion 1100), both of which have lower conductivity across the full temperature range measured. This figure confirms the lower equivalent weight of Example 4H.

Figure 2:
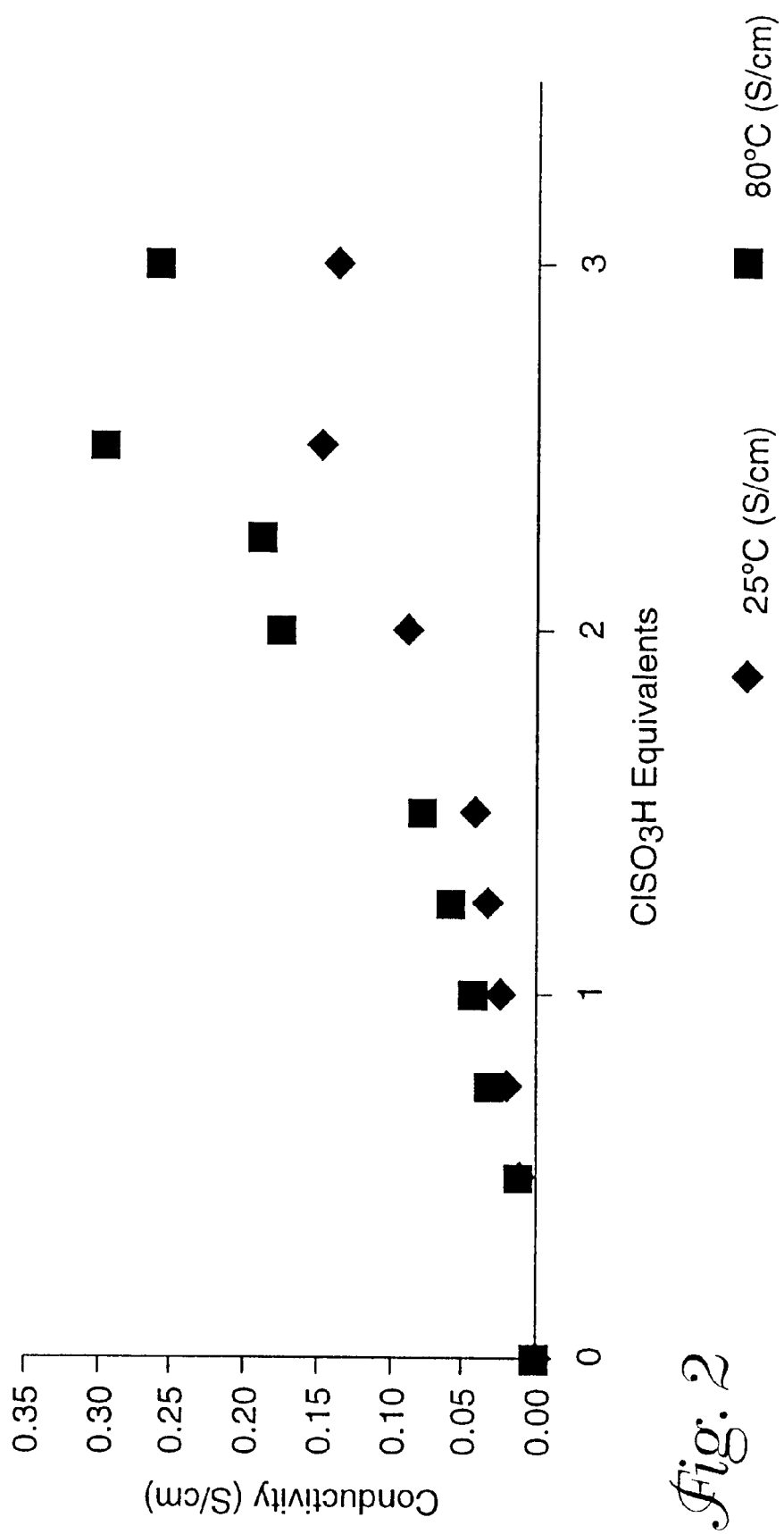
FIG. 2 is a graph of conductivity for several polymers of the present invention, at two temperatures, plotted against degree of sulfonation.

FIG. 2 illustrates the conductivity at 25° C. and 80° C. of Examples 4A through 4J, in which the polymers were sulfonated using various equivalents of chlorosulfonic acid. The conductivity increased dramatically as the number of molar equivalents of chlorosulfonic acid increased from 1.5 to 2.0 equivalents. Under the conditions of these examples the conductivity peaked at around 2.5 equivalents (Example 4H) for both temperatures, then dropped off as the number of molar equivalents of chlorosulfonic acid increased to 3.0. While not wishing to be bound by theory, the decrease in conductivity seen at the highest degree of sulfonation is believed to be due to dilution of ion-conducting sulfonic acid groups caused by significant water uptake accompanied by swelling of the polymeric membrane. It is believed that at a very low number of equivalents of chlorosulfonic acid micelles are formed with the ionic conductive groups in the interior. As the number of equivalents increases, a bi-continuous phase is formed with a hydrophilic phase providing ionic conductivity and a hydrophobic phase providing mechanical strength. As the number of equivalents increases still further, micelles form with ionic conductive groups at the exterior, which then becomes water soluble and adversely affects the mechanical properties. The present invention allows one to carefully control the level of sulfonation to provide lower equivalent weight polymers having higher ionic conductivity, while having improved mechanical properties. In a preferred embodiment to the present invention, the polymer is sulfonated to a degree that provides a bi-continuous phase. In a more preferred embodiment, the polymer is sulfonated to a degree that is at, or below but near to, the maximum level which provides a bi-continuous phase.

Figure 3:
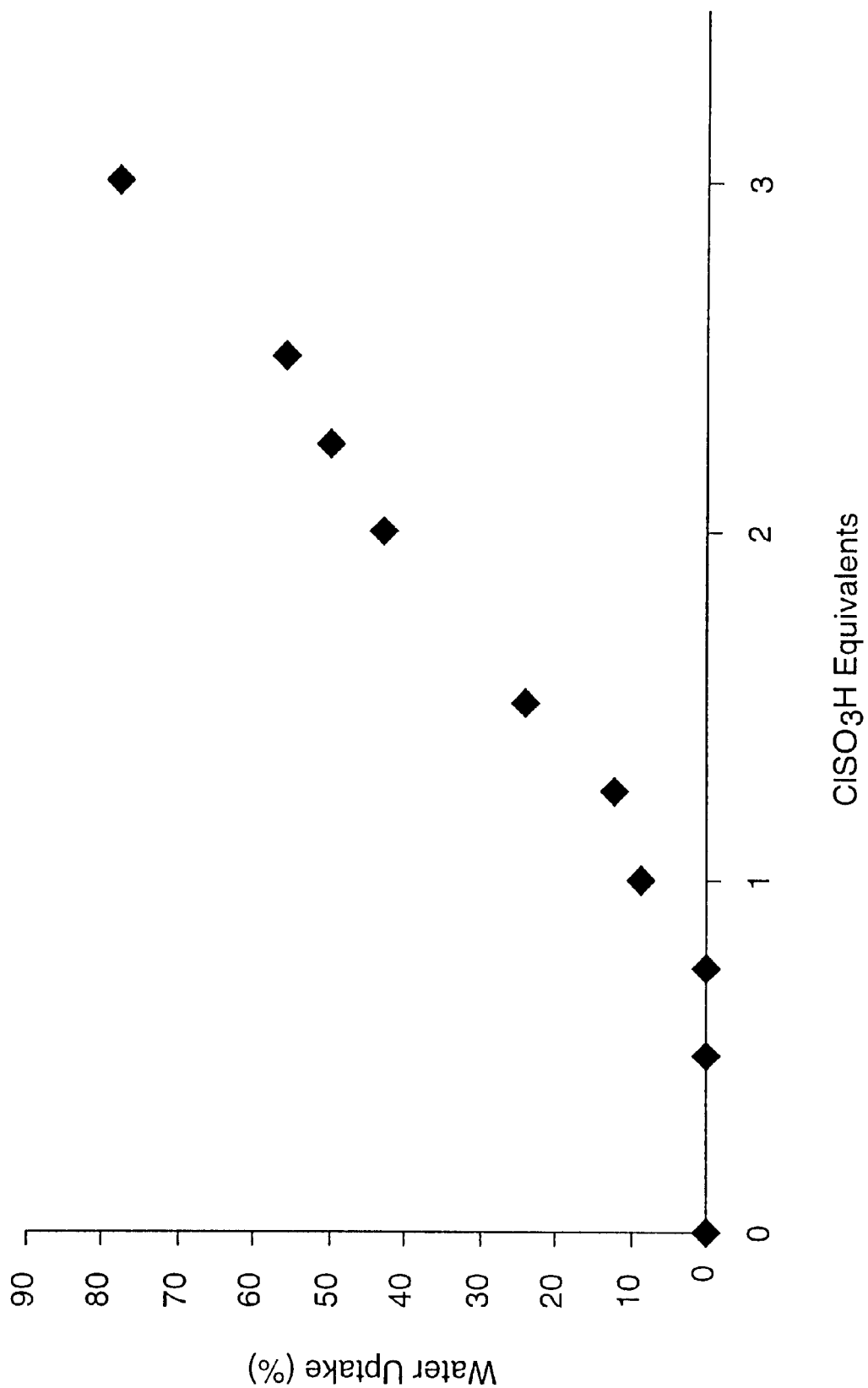
FIG. 3 is a graph of water absorption capability of several polymers of the present invention plotted against degree of sulfonation.

FIG. 3 illustrates the effect of the degree of sulfonation on the water absorption capability of the membranes. The water uptake percentage of Examples 4C, 4E, 4F, 4H, and 4J are plotted against the number of molar equivalents of chlorosulfonic acid used to sulfonate the polymers. The figure demonstrates that water uptake increases with the number of molar equivalents of chlorosulfonic acid used.

Figure 4:
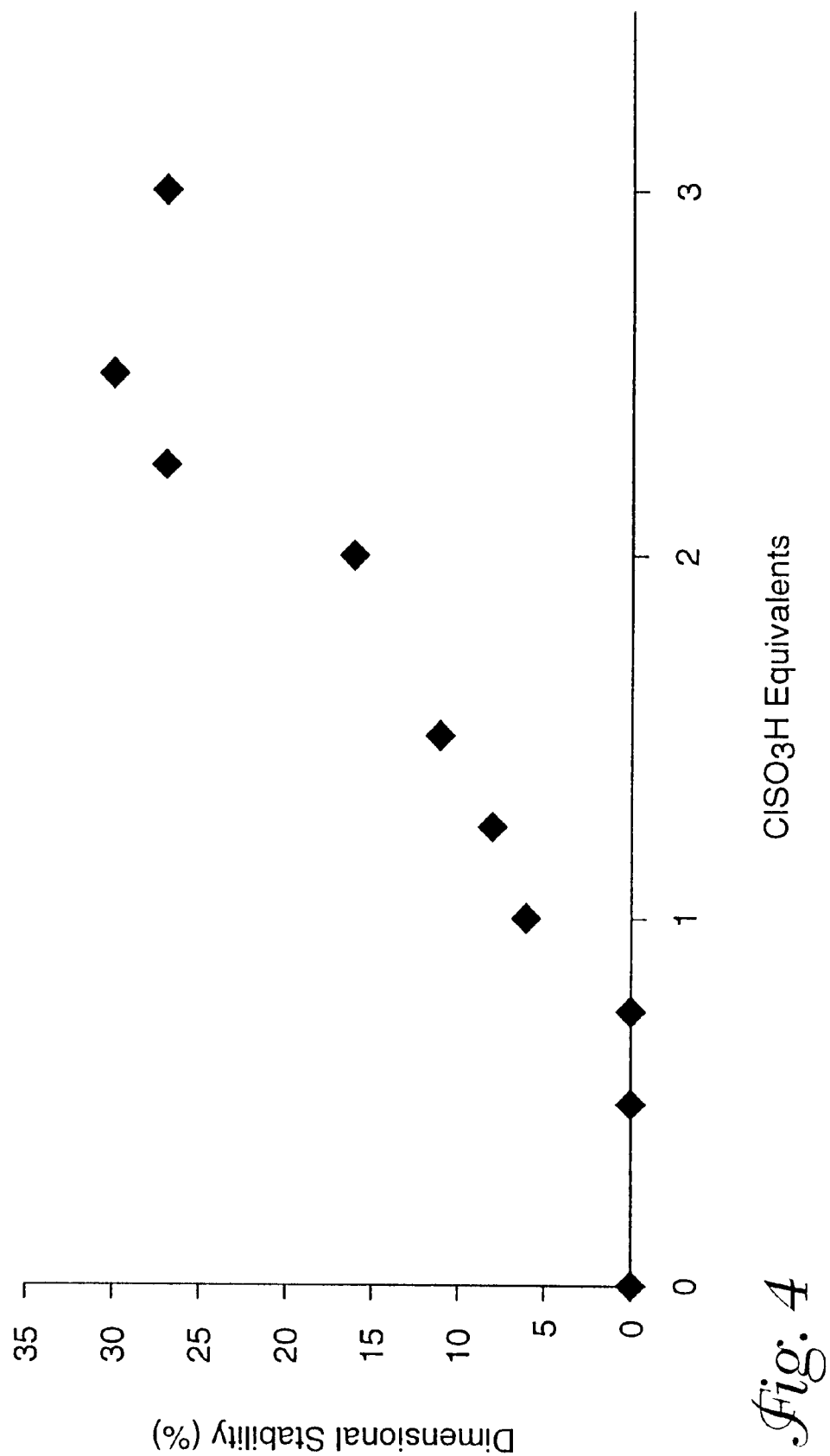
FIG. 4 is a graph illustrating the dimensional stability of several polymers of the present invention, which is a plot of dimensional change vs. degree of sulfonation.

FIG. 4 illustrates the effect of degree of sulfonation on the dimensional stability of several membranes. The average percent change in length of a side of the membrane of Examples 4C, 4E, 4F, and 4H is plotted against the number of molar equivalents of chlorosulfonic acid used to sulfonate the polymers. The figure demonstrates that membrane swelling increased as the number of molar equivalents of chlorosulfonic acid was increased.

Table 3 illustrates the mechanical properties of SPFCB membranes (both hydrated and dry membranes), along with the mechanical properties of CE 1 and CE 2 membranes.

TABLE 3

Mechanical Properties of SPFCB Membranes

| Example | Modulus (dry, MPa) | Modulus (wet, MPa) | Break Stress (dry, MPa) | Break Stress (wet, MPa) |
|---|---|---|---|---|
| 3 | 834 | 480 | 30.7 | 34.9 |
| 4C | 944 | 419 | 29.2 | 18.4 |
| 4E | 1006 | 632 | 31.4 | 24.0 |
| 4F | 967 | 352 | 32.7 | 15.3 |
| 4H | 1049 | 222 | 32.7 | 18.6 |
| 4J | 1188 | 262 | 31.4 | 12.6 |
| CE 1 | 177 | 503 | 19.7 | 10.1 |
| CE 2 | 166 | 37.7 | 24.8 | 15.0 |

The SPFCB membranes possess comparable or even higher mechanical strength than Nafion and Dow membranes while at the same time exhibiting equal or greater conductivities (Examples 4F through 4J vs. CE 2 and Example 4H vs. CE 1).

Figure 5:
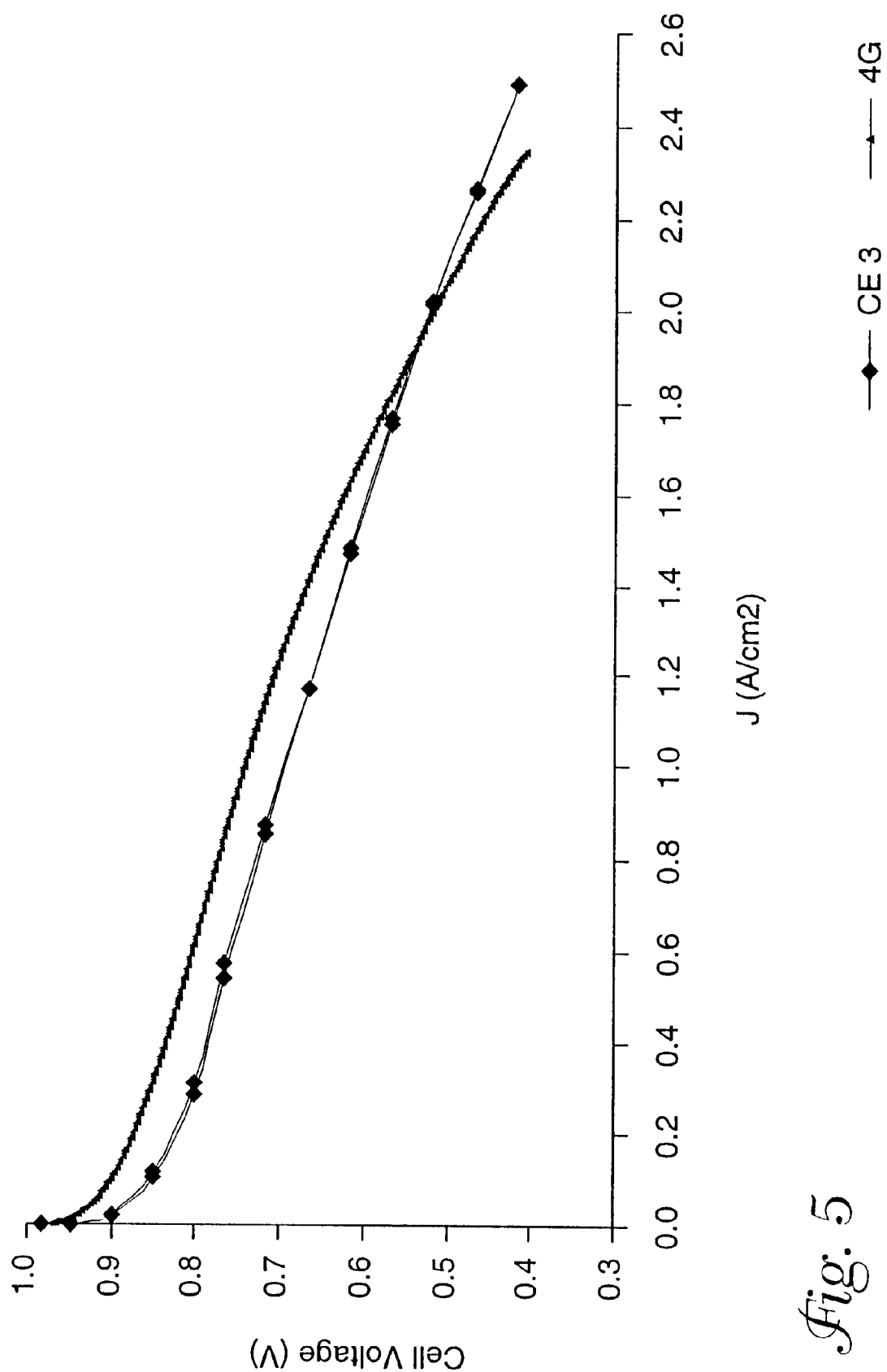
FIG. 5 is a graph of voltage plotted against current density (amps per square centimeter) for an ICM according to the present invention.

Membrane performance was tested in an operating fuel cell. FIG. 5 illustrates the polarization curve of a 55 μm (2.2 mil) thick membrane prepared from Example 4G. A cell voltage of 0.7 V was produced at a load of 1.3 A/cm$^2$ in a hydrogen/oxygen fuel cell, thus the performance under this same condition was better than that of Comparative Example 3 (Nafion 112).

Various modifications and alterations of this invention will become apparent to those skilled in the art without departing from the scope and principles of this invention. It should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A sulfonated aromatic perfluorocyclobutane polymer meeting a condition selected from: a) the equivalent weight of the polymer is 5000 or less; and b) the proton conductivity of the polymer at 25° C. is 0.01 Siemens per centimeter (S/cm) or higher.

2. The polymer of claim 1 further comprising units according to the formula:

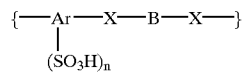

wherein —B— is 1,2-perflurorocyclobutylene ($C_4F_6$);

wherein each —X— is independently selected from the group consisting of: a bond, —O—, —S—, —SO—, —$SO_2$—, —CO—, —NH—, —$NR_1$—, and —$R_2$—, wherein $R_1$ is C1–C25 substituted or unsubstituted, saturated or unsaturated alkyl or aryl and $R_2$ is C1–C25 substituted or unsubstituted, saturated or unsaturated alkylene or arylene;

wherein —Ar— is a substituted or unsubstituted C1–C30 at least divalent aromatic hydrocarbon group; and wherein n is a non-negative integer chosen independently for each of said repeating units such that the average for the polymer is greater than 0.

3. The polymer according to claim 2 wherein the proton conductivity of the polymer at 25° C. is 0.02 S/cm or higher.

4. The polymer according to claim 2 wherein the proton conductivity of the polymer at 25° C. is 0.10 S/cm or higher.

5. The polymer according to claim 2 wherein the equivalent weight of the polymer is 1250 or less.

6. The polymer according to claim 2 wherein the equivalent weight of the polymer is 800 or less.

7. The polymer according to claim 2 wherein —X— is —O—.

8. The polymer according to claim 2 wherein —Ar— is 4,4'-biphenylene.

9. An ion conducting membrane comprising the polymer according to claim 2.

10. The polymer according to claim 2 having at least one property selected from:
a) a dry break strength of 15 MPa or greater; and b) a wet break strength of 10 MPa or greater.

11. A polymer according to claim 2 which is branched and which additionally comprises units according to the formula:

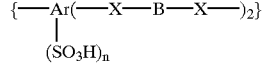

wherein —B—, —X— and n are defined as above; and
wherein —Ar— is a substituted or unsubstituted C1–C30 at least trivalent aromatic hydrocarbon group.

12. The polymer according to claim 11 wherein —Ar— is 1,1,1-tris(4-phenylene) ethane.

13. The polymer according to claim 12 wherein —X— is —O—.

14. A polymer blend comprising the polymer according to claim 2 wherein said blend has a proton conductivity at 25° C. of 0.02 S/cm or higher.

15. A polymer blend according to claim 14 additionally comprising a fluoropolymer.

16. An ion conducting membrane comprising the polymer blend according to claim 15.

17. A process for preparing a polymer comprising the step of sulfonating a perfluorocyclobutane polymer to form a sulfonated perfluorocyclobutane polymer, wherein said sulfonated perfluorocyclobutane polymer is sufficiently sulfonated as to meet a condition selected from: a) the equivalent weight of the polymer is 5000 or less; and b) the proton conductivity of the polymer at 25° C. is 0.01 S/cm or higher.

18. The process according to claim 17, wherein the sulfonated perfluorocyclobutane polymer has a structure comprising units according to the formula:

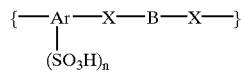

wherein —B— is 1,2-perflurorocyclobutylene ($C_4F_6$);

wherein each —X— is independently selected from the group consisting of: a bond, —O—, —S—, —SO—, —$SO_2$—, —CO—, —NH—, —$NR_1$—, and —$R_2$—, wherein $R_1$ is C1–C25 substituted or unsubstituted, saturated or unsaturated alkyl or aryl and $R_2$ is C1–C25 substituted or unsubstituted, saturated or unsaturated alkylene or arylene;

wherein —Ar— is a substituted or unsubstituted C1–C30 at least divalent aromatic hydrocarbon group; and wherein n is a non-negative integer chosen independently for each of said repeating units such that the average for the polymer is greater than zero.

19. The process according to claim 17, wherein the step of sulfonation is accomplished by
A) applying a halosulfonic acid to add sulfonyl halide groups to the perfluorocyclobutane polymer; and thereafter
B) hydrolyzing said sulfonyl halide groups to form sulfonic acid groups.

20. A process for preparing a proton exchange membrane comprising the step of claim 19, additionally comprising the steps of forming the polymer into a membrane after A) and before B).

21. The process according to claim 17, wherein the step of sulfonation is accomplished by application of sulfuric acid.

22. The process according to claim 17, wherein the step of sulfonation provides a polymer having at least one property selected from: a) a dry break strength of 15 MPa or greater; and b) a wet break strength of 10 MPa or greater.

23. The process of to claim 17, wherein the polymer is in the form of a membrane.

24. A process for preparing a sulfonated perfluorocyclobutane polymer comprising:

A) providing a perfluorocyclobutane polymer including sulfur-containing groups; and B) converting said sulfur-containing group into a sulfonic acid group to form a sulfonated perfluorocyclobutane polymer, wherein said sulfonated perfluorocyclobutane polymer is sufficiently sulfonated as to meet a condition selected from: a) the equivalent weight of the polymer is 5000 or less; and b) the proton conductivity of the polymer at 25° C. is 0.01 S/cm or higher.

25. The process according to claim 24, wherein the step of converting is accomplished by hydrolysis.

26. The process according to claim 24, wherein said sulfur-containing groups are sulfonyl halide groups.

27. A process for preparing a proton exchange membrane comprising the steps of claim 24, additionally comprising the step of forming said polymer into a membrane after A) and before B).

* * * * *

UNITED STATES PATENT AND TRADEMARK OFFICE
CERTIFICATE OF CORRECTION

PATENT NO.    : 6,559,237 B1                                             Page 1 of 1
DATED         : May 6, 2003
INVENTOR(S)   : Mao, Shane S.

It is certified that error appears in the above-identified patent and that said Letters Patent is hereby corrected as shown below:

<u>Title page,</u>
Item [56], References Cited, U.S. PATENT DOCUMENTS,
Please add the following reference -- 3,642,728    02/1972    Canter --
Item [57], ABSTRACT,
Line 11, change the chemicals from "—$NR_1$—, and —$R_2$—, wherein $R_1$ is C1-C25" to -- —$NR^1$—, and —$R^2$—, wherein $R^1$ is C1-C25 --
Line 13, change the chemical from "or aryl and $R_2$ is C1-C25 substituted" to -- or aryl and $R^2$ is C1-C25 substituted --

<u>Column 1,</u>
Line 21, "$(H_+)$" should be -- $(H^+)$ --

<u>Column 2,</u>
Line 63, "—$NR_1$—" should be -- —$NR^1$— --
Line 64, "—$R_2$—, wherein $R_1$ is" should be -- —$R^2$—, wherein $R^1$ is --
Line 65, "and $R_2$" should be -- and $R^2$ --
Line 67, "$R_1$ and $R_2$" should be -- $R^1$ and $R^2$ --

<u>Column 11,</u>
Lines 29-30, "—$NR_1$—, and —$R_2$—, wherein $R_1$ is C1-C25" should be -- —$NR^1$—, and —$R^2$—, wherein $R^1$ is C1-C25 --
Line 31, "$R_2$" should be -- $R^2$ --

<u>Column 12,</u>
Lines 33-34, "—$NR_1$—, and —$R_2$—, wherein $R_1$ is C1-C25" should be -- —$NR^1$—, and —$R^2$—, wherein $R^1$ is C1-C25 --
Line 35, "$R_2$" should be -- $R^2$ --

Signed and Sealed this

Thirtieth Day of September, 2003

JAMES E. ROGAN
*Director of the United States Patent and Trademark Office*